(12) United States Patent
Barger

(10) Patent No.: US 8,826,702 B1
(45) Date of Patent: Sep. 9, 2014

(54) VEHICLE MOUNTED FIREARM LOCK

(71) Applicant: John J. Barger, Webster, NH (US)

(72) Inventor: John J. Barger, Webster, NH (US)

( * ) Notice: Subject to any disclaimer, the term of this patent is extended or adjusted under 35 U.S.C. 154(b) by 0 days.

(21) Appl. No.: 13/919,604

(22) Filed: Jun. 17, 2013

Related U.S. Application Data

(60) Provisional application No. 61/716,683, filed on Oct. 22, 2012.

(51) Int. Cl.
*E05B 73/00* (2006.01)
*B60R 7/14* (2006.01)

(52) U.S. Cl.
CPC .. *E05B 73/00* (2013.01); *B60R 7/14* (2013.01)
USPC .............. 70/19; 70/14; 70/18; 70/58; 70/209; 211/4; 211/64

(58) Field of Classification Search
USPC ............... 70/14, 18, 19, 57, 58, 62, 209, 232; 211/4, 8, 9, 64
See application file for complete search history.

(56) References Cited

U.S. PATENT DOCUMENTS

| | | | | |
|---|---|---|---|---|
| 1,793,432 | A | * | 2/1931 | Sczepczenski ................... 70/46 |
| 3,326,385 | A | * | 6/1967 | Pinkerton et al. ................. 211/4 |
| 3,905,214 | A | * | 9/1975 | Bell ................... 70/58 |
| 4,364,499 | A | * | 12/1982 | McCue ........................ 224/569 |
| 4,747,280 | A | | 5/1988 | Shaw |
| 4,881,386 | A | | 11/1989 | Glines |
| 4,949,559 | A | | 8/1990 | Glines |
| 4,991,413 | A | * | 2/1991 | Arnaldo ............................. 70/19 |
| 5,197,309 | A | * | 3/1993 | Del Rosario .................... 70/209 |
| D356,541 | S | | 3/1995 | Morford |
| 5,531,368 | A | | 7/1996 | Morford |
| 5,676,000 | A | * | 10/1997 | Chen ............................... 70/209 |
| 5,779,120 | A | | 7/1998 | Morford |
| 5,934,112 | A | | 8/1999 | Rice et al. |
| 6,360,931 | B1 | | 3/2002 | Morford |
| 6,438,885 | B1 | * | 8/2002 | Murray et al. ............... 42/70.07 |
| 6,584,719 | B1 | | 7/2003 | Morford |
| 6,595,284 | B2 | * | 7/2003 | Davis ......................... 166/241.4 |
| 6,598,433 | B1 | | 7/2003 | Malvasio |
| 6,742,687 | B2 | | 6/2004 | Morford |
| D508,657 | S | | 8/2005 | Belden, Jr. |
| 6,986,446 | B2 | | 1/2006 | Murray et al. |
| 7,047,771 | B2 | | 5/2006 | Tanos |
| 7,195,297 | B2 | | 3/2007 | Murray et al. |
| 2006/0113341 | A1 | | 6/2006 | Murray et al. |

* cited by examiner

*Primary Examiner* — Suzanne Barrett
(74) *Attorney, Agent, or Firm* — Loginov & Associates, PLLC; William A. Loginov

(57) ABSTRACT

This invention provides a locking system for a weapon that resists prying by a flat-headed tool. The system includes a base having a base channel for receiving an elongated portion of a weapon. A gate is hingedly attached to the lid by a hinge assembly. The gate moves between an open position and a closed position. The gate includes a gate channel that overlies the base channel in the closed position. A lock assembly selectively secures the gate with respect to the base in the closed position. A novel front joint, opposite the hinge assembly, is provided. It includes an internal lap joint with an overlap structure on each of a base front joint edge and a gate front joint edge. The base front joint edge and the gate front joint edge can each define a confronting, approximately horizontal surface forward of the internal lap joint.

20 Claims, 12 Drawing Sheets

VEHICLE MOUNTED FIREARM LOCK

RELATED APPLICATION

This application claims the benefit of U.S. Provisional Application Ser. No. 61/716,683, filed Oct. 22, 2012, entitled VEHICLE MOUNTED FIREARM LOCK, the entire disclosure of which is herein incorporated by reference.

FIELD OF THE INVENTION

The field of this invention relates to firearms locks and more particularly, to firearms locks that are mounted within a vehicle.

BACKGROUND OF THE INVENTION

Law enforcement, paramilitary and military vehicles transport officers and soldiers into potentially hazardous environments. It is common that these individuals will bring both personally worn weapons and additional weapons, including shotguns, assault rifles, submachine guns, and other tactical weapons. When an officer, agent or soldier requires additional firepower, they turn to readily available weapons that are carried within the vehicle in a vehicle mounted rack. The simplest of racks include a simple u-shaped clamp that is biased so as to provide a frictional hold on the stock and/or barrel of the weapon. However, these racks can sometimes fail while travelling on bad roads and trails, letting the weapon bounce around the vehicle interior. Depending on the condition of carry, whether loaded or unloaded, and whether a round is in the chamber, this can become an unsafe situation.

Weapons carried in simple mounts are not secured against theft or pilferage. This is particularly problematic in urban situations. Theft of firearms from police vehicles domestically and from the military are an ongoing problem. The earliest vehicle mounted gun lock assemblies with a locking device were developed in the 1930s. The basic design for this continues, with a few improvements, to remain in use. The prior art, as set forth in FIG. 1 is a combination of a gun lock assembly 100 with a closing gate 102 and a locking device 104. FIG. 1 is an end-on view of a locking vehicle gun lock assembly that is derived from FIG. 8 of issued U.S. Pat. No. 4,747,280 entitled LOCK DEVICE, the teachings of which are incorporated herein by reference. This illustrative gun lock assembly represents the current state of the art. The conventional rack is formed of a zinc alloy that affords a strong, relatively light weight and affordable locking product. The zinc is not as strong as steel, but affords sufficient strength to resist mild to moderate forces. If, however, the lock is damaged or the key is lost, the weapon owner can eventually access and remove the weapon with the application of determined brute force.

The gate 102 encloses the article-receiving channel 106. The channel 106 is sized appropriately to the barrel of a weapon. The gate is provided with a lip 108 that makes contact with the upper surface 110 of the channel outer retaining wall 112. The lip 108 projects outwards, creating a space 114 between the lip 108 and the retaining wall 112. The gate 102 is typically held under tension by a tension spring 116. The spring is a conventional spring in various embodiments and is used by various manufacturers of such locks.

FIG. 2 is an image of a criminally-minded individual 200 who has made an unauthorized entry into the back or front seat area 202 of an illustrative police patrol car 204 for the purpose of stealing a gun 206 secured in a vehicle mounted gun lock assembly 208. The criminal 200 is equipped with a flat-head tool 210 (e.g., a flat-head screw-driver). The criminal 200 will use an exemplary screw-driver 210 to break into the gun lock assembly 208 and steal the gun retained therein.

The criminal inserts the end of the screw-driver 210 into the space 114 between the lip 108 and the retaining wall 112. The criminal seats the screw-driver 210 in the space 114 and pries the screw-driver upwards in a rotating motion 302. This raises the lip 108 of the gate 102, causing flexure of the gate and a loading of force into the gate that will result in fracture along or near to the anticipated failure axis AF. The gate fracture provides access to and removal of the enclosed firearm. Thus, forcible entry is actually facilitated by the geometry of the lip 108 and the space 114. Undesirably, this affords an opportunity for any criminal armed with a screw-driver, pry bar or similar tool that can be placed between the lip and the body of the rack to help themselves to a law enforcement weapon.

It is therefore desirable to provide a vehicle gun lock that is relatively difficult to force open, and if broken, defines a geometry that will not provide ready access to the contained weapon. It is further desirable to provide a tamper-proof gate that can defeat bending attempts involving a screw-driver, pry bar or other readily available implement.

SUMMARY OF THE INVENTION

This invention overcomes disadvantages of prior art by providing a locking system for a weapon that resists prying by a flat-headed tool. The system includes a base having a base channel for receiving an elongated portion of a weapon. A gate is hingedly attached to the lid by a hinge assembly. The gate moves between an open position and a closed position. The gate includes a gate channel that overlies the base channel in the closed position. A lock assembly that selectively secures the gate with respect to the base in the closed position. A novel front joint, opposite the hinge assembly, is provided. It includes an internal lap joint with an overlap structure on each of a base front joint edge and a gate front joint edge. The base front joint edge and the gate front joint edge can each define a confronting, approximately horizontal surface forward of the internal lap joint. The locking system is provided with the base front joint edge and the gate front joint edge each defining a confronting approximately horizontal surface forward of the internal lap joint. The internal lap joint is upwardly and forwardly angled at approximately 6 to 10 degrees with respect to a vertical plane transverse to a plane of the horizontal surface and the front surface of the base front edge and a confronting wall of the lip are each upwardly and a forwardly angled at approximately 6 to 10 degrees with respect to the vertical plane and the vertical plane is transverse to a plane of the horizontal surface.

In illustrative embodiments, one of the base and the gate is constructed as a casting and the materials can be at least one of a metal, a polymer and a composite material. At least one of the base channel and the base top defines a rounded bottom to conform to an elongated portion of the weapon. The channel can be lined with a protective layer of material. The lining can be over the channel and a separate lining can be provided on the gate. The lining can be composed of a resilient natural and/or synthetic polymer (or a composite thereof), or of a woven or non-woven cloth (for example, felt), or another similar material. The lock assembly can be at least one of a) manually actuated and b) electrically actuated. The base can be provided with pre-drilled mounting holes in an illustrative embodiment. The locking system can include an insert that reduces the depth of the channel (i.e., reduces the vertical dimension or overall volume of the channel).

In another embodiment, the front joint of the above-described locking system, opposite the hinge assembly, includes a gate front joint edge defines a groove and a base front joint edge that defines a tongue. The groove conforms to, and confronts, the tongue in the closed position. The tongue and the groove can include an internal lap joint formed between an interior wall of the tongue and a confronting wall of the groove. In addition, the tongue can include a top surface and the groove can include a confronting groove top surface. Each top surface is approximately aligned along a common horizontal plane in the closed position. The interior wall of the tongue and an exterior wall of the tongue can each taper upwardly and forwardly at approximately 6 to 10 degrees with respect to a vertical plane transverse to the horizontal plane. In this manner a lever point is further denied to an individual seeking to pry the gate.

In a further embodiment, the tongue on the front wall can be constructed so that it does not fully extend to the ends of the front wall. The corresponding receiving groove in the gate can be shortened so that the tongue and receiving groove are not accessible from the ends of the lock. The tongue engages the receiving groove in the closed position. An insert can be provided to be removably attached to the base and adapt the lock to firearms having smaller members (for example, a shotgun) while maintaining the integrity of the lock. The system includes at least one of a key-opened and electrically operated lock that maintains the gate in the closed position.

BRIEF DESCRIPTION OF THE DRAWINGS

The invention description below refers to the accompanying drawings, of which.

DETAILED DESCRIPTION

I. Illustrative Locking System

Figure 1:
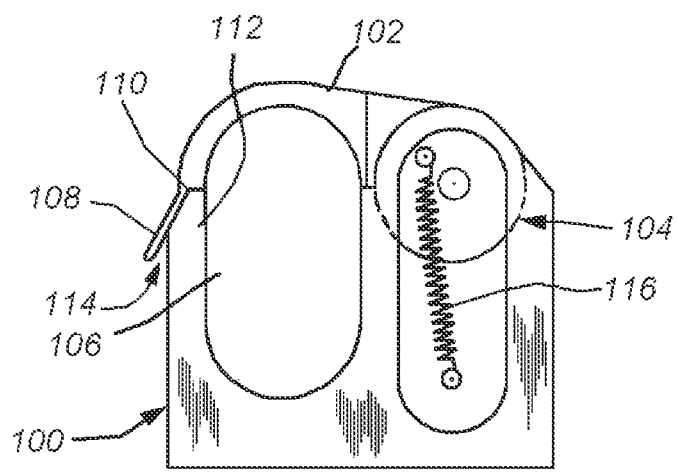
FIG. 1, already described, is an end view of an illustrative vehicle mounted gun lock according to the prior art.
Figure 2:
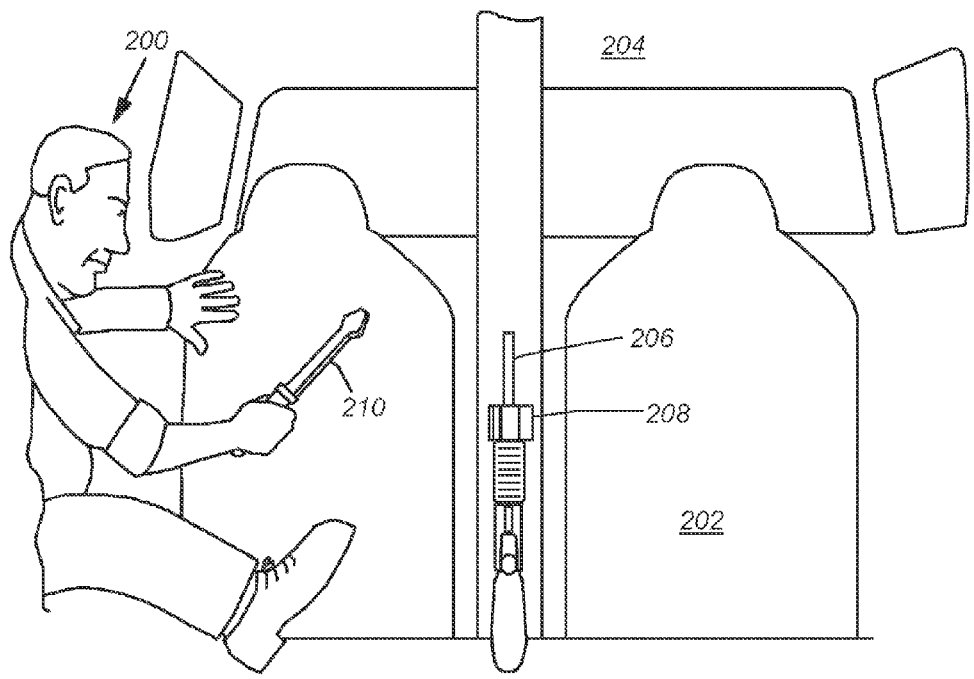
FIG. 2, already described, is perspective view of a criminally minded individual preparing to remove a weapon secured in a gun lock according to the prior art.
Figure 3:
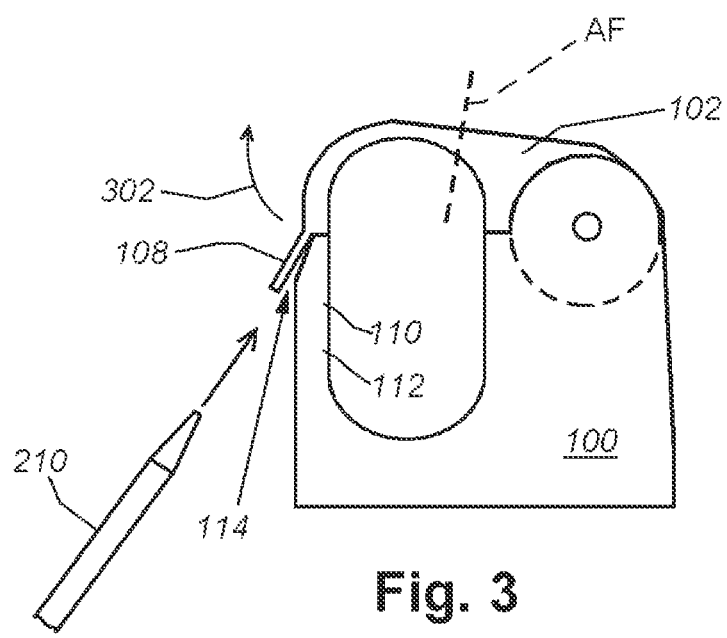
FIG. 3, already described, is and end view of the gun lock of FIG. 1 about to be forced open by a tool according to the prior art.
Figure 4:
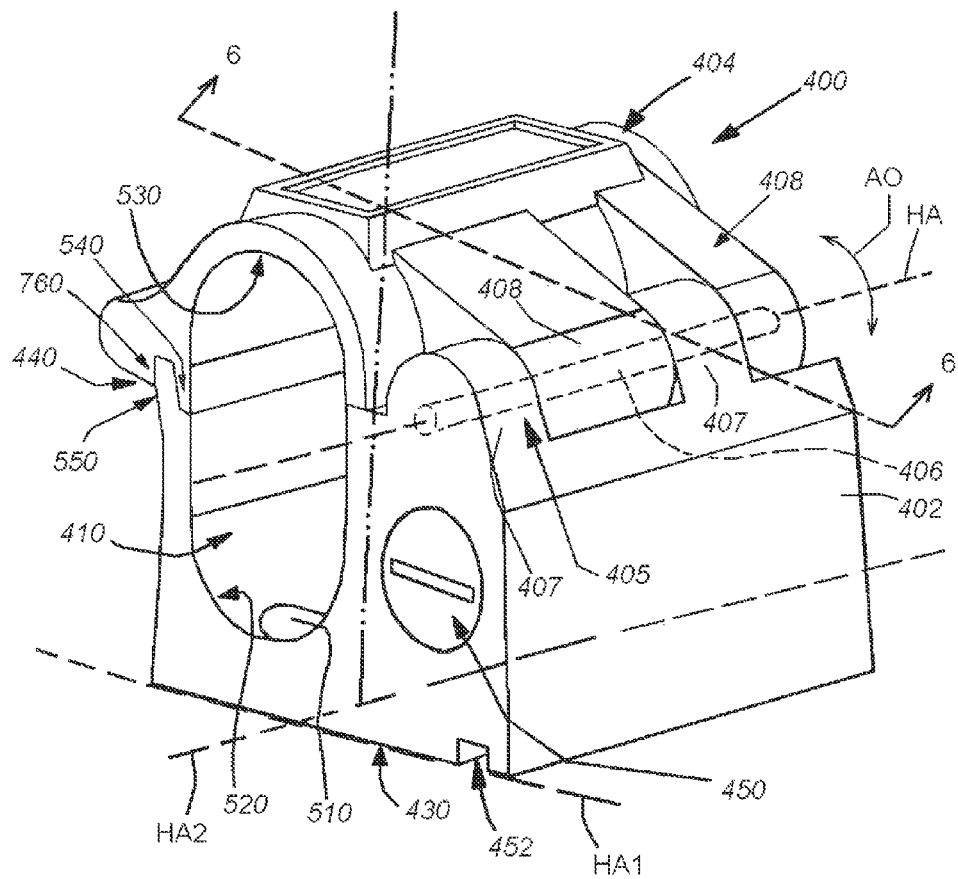
FIG. 4 is a perspective view of a firearm locking system in a closed (locked) position according to an illustrative embodiment.
Figure 5:
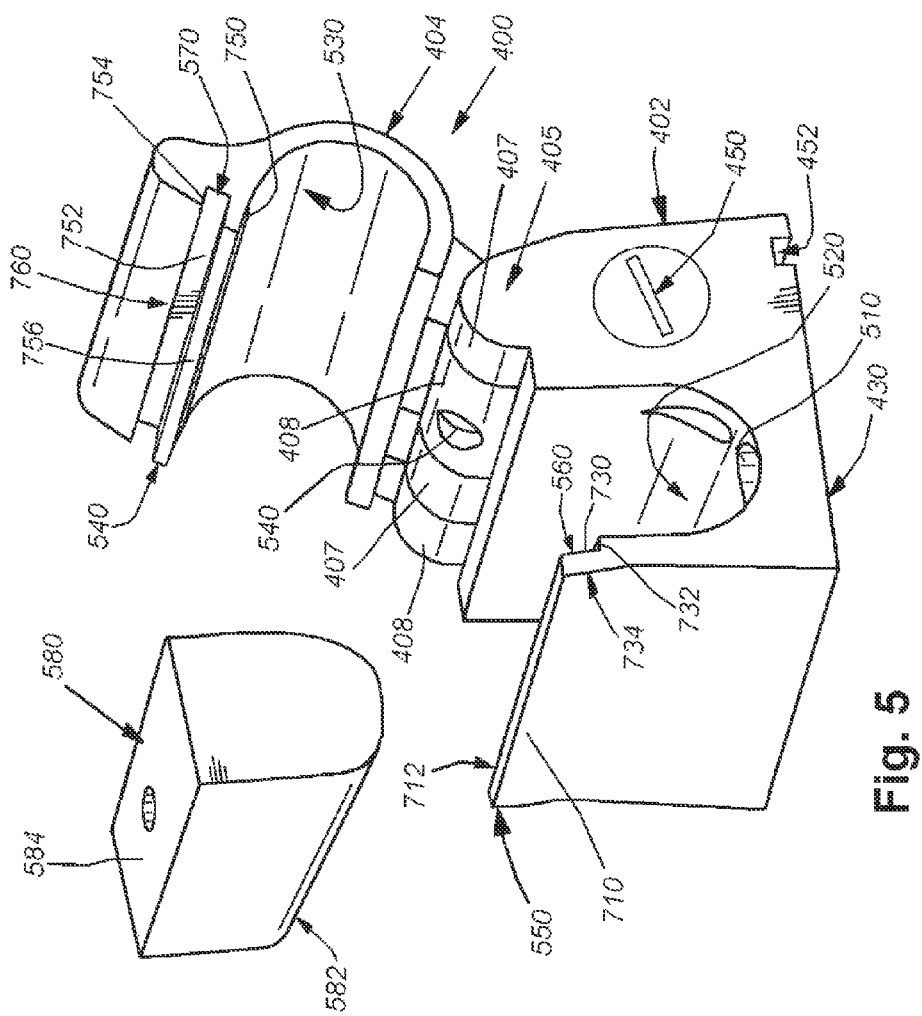
FIG. 5 is a perspective view of the locking system of FIG. 4 in an opened position, and also detailing an optional insert that can be employed to reduce the size of the of the system's channel for use with smaller cross-section firearm components (e.g. barrels)

FIG. 4 is a perspective view of an illustrative firearm locking system (also termed a "gun lock") 400 having a base 402 that is typically mounted to an underlying vehicle surface (not shown) and a hinged gate 404. The base 402 and gate 404 are hingedly joined at an associated hinge assembly 405 that includes an embedded hinge pin 406 (shown in phantom). The arrangement of hinged elements is highly variable. In an embodiment, the hinge assembly includes spaced apart (along the direction of hinge axis HA) two base segments 407 and two intervening gate segments 408. The number of interleaved hinge segments is highly variable in alternate embodiments as is the relative size and arrangement of such segments. The two gate segments 408 are formed on raised arms that extend rearwardly as shown. With reference also to FIG. 5, the gate 404 is hingedly moveable from a closed (locked) position to an open (unlocked) (see FIG. 5) position, and its rotational motion describes an opening arc AO of approximately 180 degrees, or an opening angle that is otherwise sufficient to provide clearance to insert or remove an elongated section of a firearm (e.g. a barrel, gas tube, receiver portion, etc.).

In the depicted closed position (FIG. 4), the gate and base define an internal channel that defines an approximately continuous cross section along the side-to-side direction (i.e. parallel with hinge axis HA). In alternate embodiments, the channel 410 can define a varying cross section along its length (side-to side). The size of the channel is chosen to accommodate an elongated portion of a weapon having exterior dimensions that are slightly smaller than those of the channel (e.g. the diameter of a barrel). The channel 410 can be lined with an appropriate non-marring and/or cushioning material, such as felt, rubber, silicone, or the like. As described below with can include soft or hard inserts to enhance cushioning and provide anti-rattle protection. As shown in FIG. 5, a plurality of mounting holes (one hole 510 being visible) are provided in the bottom of the base channel 520. The mounting holes 510 are used in conjunction with threaded (or other types of) fasteners that allow the base 402 to be secured to a surface on the vehicle. The outer edge of the bottom surface 430 defines a flat, horizontal plane (along each of orthogonal horizontal axes HA1 and HA2) in this embodiment. In alternate embodiments, the bottom surface 430 can be shaped to conform to the shape of the expected surface (e.g. a semi-cylinder where the base is mounted to a post). Passing perpendicularly through the horizontal plane is a vertical axis VA. This axis VA is generally aligned with the top-to-bottom orientation of the channel 410. As shown, the bottom of the base channel 520 and top of a corresponding gate channel 530 are each semi-cylindrical in this embodiment, but a variety of axially continuous or axially varying shapes can be employed in alternate embodiments. The firearms lock can be employed to secure non-firearms devices, including but not limited to, riot batons, "shock sticks", long handled axes and the like.

Figure 6:
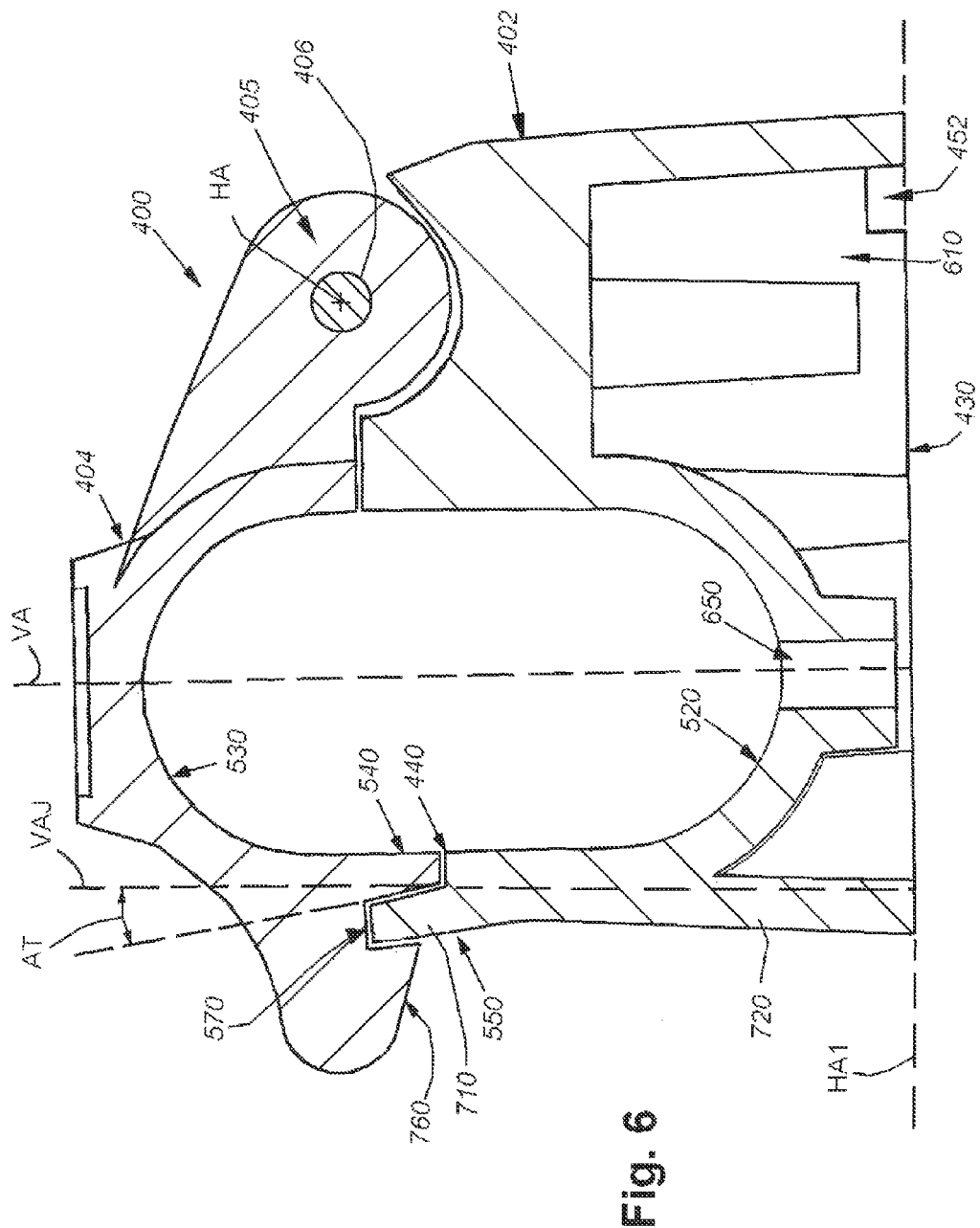
FIG. 6 is a side cross section of the overall locking system taken along line 6-6 of FIG. 4.

As shown further in FIG. 5, when the gate 404 is located in the open position, the front joint edge 540 of the gate 404 separates from engagement with the front joint edge 550 of the base 402. In cross section, as shown generally in FIG. 6, the front joint defines a series of insets and angles that generate a hard-to-defeat, overlapping geometry. This geometry is described further below.

Note, as used herein, "front" and "forward" are each defined as a direction taken from the axis HA toward the front opening joint 440 (collectively consisting of the two joint edges 540 and 550). "Rear" and "rearward" are each defined as a direction opposite "front" and "forward", from the front joint 440 toward the hinge axis HA. "Up" and "upward" are each defined as a direction taken from the base and toward the gate with "top" being at the approximate maximum point, "Down" and "downward" are each defined as a direction taken from the gate and toward the base with "bottom" being at the approximate maximum point. "Interior" is defined as a region or surface facing or in the open space of the channel 410, while "exterior" is defined as a region or surface facing away from the space of the channel and/or residing on an outside surface of the base or gate and exposed to the outside environment. More generally, as used herein the directional terms, such as, but not limited to, "up" and "down", "top" and "bottom", "inside" and "outer", "front" and "back", "inner" and "outer", "interior" and "exterior", "downward" and "upward", "horizontal" and "vertical" should be taken as relative conventions only, rather than absolute indications of orientation or direction with respect to a direction of the force of gravity.

The gate 404 and base 402 can be constructed of a cast metal, such as zinc alloy, aluminum alloy, or other lightweight metal. Other manufacturing techniques, such as machining and/or forging can be used to construct these main components. In various embodiments, the gate and/or base can be cast from a synthetic polymer, a ceramic, a fiber (glass, carbon, nylon, etc.) composite, or a combination thereof. The interior surfaces of the gate and/or base can be provided with a lining that protects the surface finish of the enclosed firearm. The lining can be composed of a resilient natural and/or synthetic polymer (or a composite thereof), or of a woven or non-woven cloth (for example, felt), or another similar material.

As shown, the base includes a lock assembly 450 that allows the gate to be opened via a key (not shown). The lock assembly can also include an electronic solenoid assembly (not shown) for switched, electrical actuation of the locking mechanism. The solenoid resides with appropriate electronics in a region 610 (FIG. 6) beneath the hinge assembly 405. A groove 452 provides clearance for electrical wires. The lock can be switched in a variety of ways, including a hidden switch within the vehicle or a biometric interface, keypad, or other access system mounted on, or adjacent to the system 400. As shown in FIG. 5, the hinge segment 408 on the gate 404 includes a hole 540 arranged to engage a locking pin (not shown) when the gate is in the closed position. The locking pin can be spring-loaded so that it normally engages the hole 540, and is withdrawn when the solenoid is energized or a manually operated lock tumbler (450) is rotated.

Figure 7:
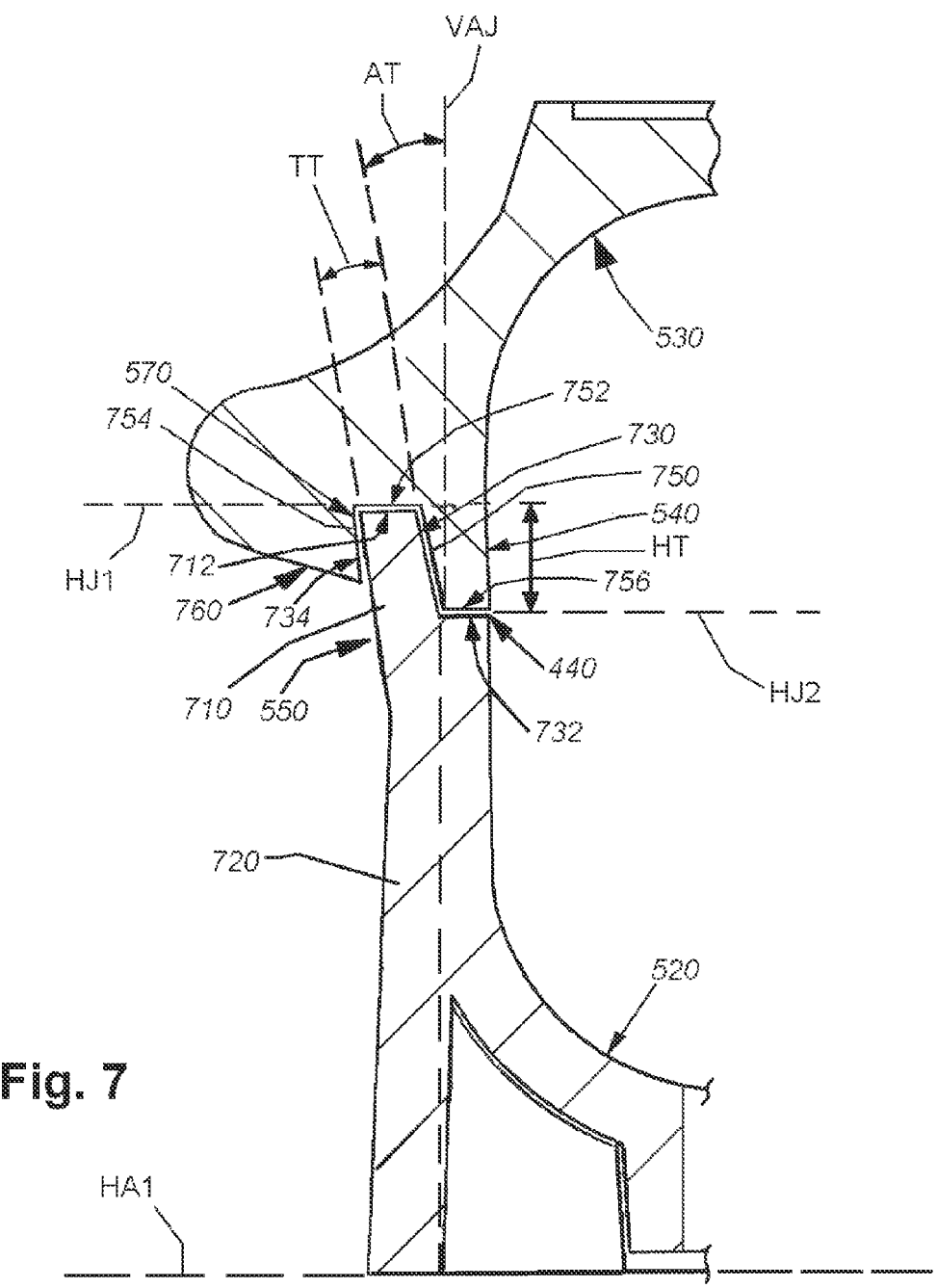
FIG. 7 is a more-detailed side cross section of the front joint between the hinged gate and base of the locking system according to FIG. 6.

Reference is now also made to FIG. 7, which shows the elements and geometry of the front joint 440 in more detail. For the purposes of this description a vertical axis VAJ, parallel to the main vertical axis VA is provided in proximity to the front joint 440 as shown. This axis VAJ extends perpendicular to the horizontal axis HA1 and associated horizontal plane (the "base plane") also defined by orthogonal horizontal axis HA2 (FIG. 4). The vertical axis VAJ resides within a "vertical plane" (not shown), running parallel to the hinge axis HA. Taken in cross section (and running from side to side), the base front joint edge 550 defines forwardly angled parallelogram-shaped tongue 710 that ends at a top 712 that (in this embodiment) defines a horizontal plane along axis HJ1 parallel to the base plane. The tongue 710 is a unitary construction with a front base wall 720 and it extends upwardly from the front base wall. Tongue 710 extends from the front side of the base wall 720, thus defining an inset region 560 (see FIG. 5 for clarity) with an interior inset wall 730 and an inset bottom 732 facing the channel 410. In this embodiment, the inset bottom also lies approximately along a horizontal plane defined by axis HJ2. The opposing walls (730 and 734) extend upwardly and forwardly from the vertical plane (and axis VAJ) extend forwardly and upwardly at an acute angle AT of between approximately 6 and 10 degrees, but this measurement is highly variable. In alternate embodiments, the tongue and groove and define a dimension that is approximately vertical (i.e., 0 degrees with respect to axis VAJ).

The tongue 710 of the base front joint edge is overlapped at both the inset 560 and its exterior, front wall 734 by a conforming groove 570 (also shown in FIG. 5 for clarity). The groove 570 is defined by two side walls 750 and 754, a groove top 752 an inner bottom 756 and an external, downwardly protruding lip 760. The grove 570 overlies all three sides of the tongue 710, and relatively closely conforms to its shape, geometry and dimensions—with the groove defining slightly larger inner dimensions than the outer dimensions for the tongue to avoid binding and jamming. More particularly, as shown in the closed position: outer tongue wall 734 confronts outer groove wall 754; tongue top 712 confronts groove top 752; inner tongue wall 730 confronts inner groove wall 750; and groove bottom 756 confronts inset top 732. In an embodiment, the tongue has a height HT between the planes of HJ1 and HJ2 of approximately 0.3 inches and a thickness TT (at least adjacent to the top 712) of approximately 0.2 inches. These dimensions are highly variable and the sidewalls of the tongue and groove can be tapered (i.e. the tongue being upwardly tapered), or otherwise cross-sectionally shaped in alternate embodiments.

The tongue and groove geometry of the front joint 440 renders breakage of the gate by prying with a flat-headed tool head difficult. If an individual attempts to engage the gap between the walls 754 and 734, he or she must approach then from beneath in a highly depressed and almost vertical angle. This is a difficult approach angle in which to gain leverage, particularly since the underlying mounting surface will interfere with a long tool. If a tool is successfully wedged between the walls, then the resulting lever action will act mainly in a forward-to-rearward direction between the lip 760 and the tongue 710. This will not apply any appreciable bending moment to the upper arc of the gate—where breakage often occurs. Even if sufficient force is applied to achieve fracture and breakage, the depicted cross section and front joint geometry would generally limit such breakage to a forward region of the gate and/or base, leaving enough of the structure intact to restrain the weapon within the remaining channel.

II. Alternate Locking System Omitting Front Lip

Figure 8:
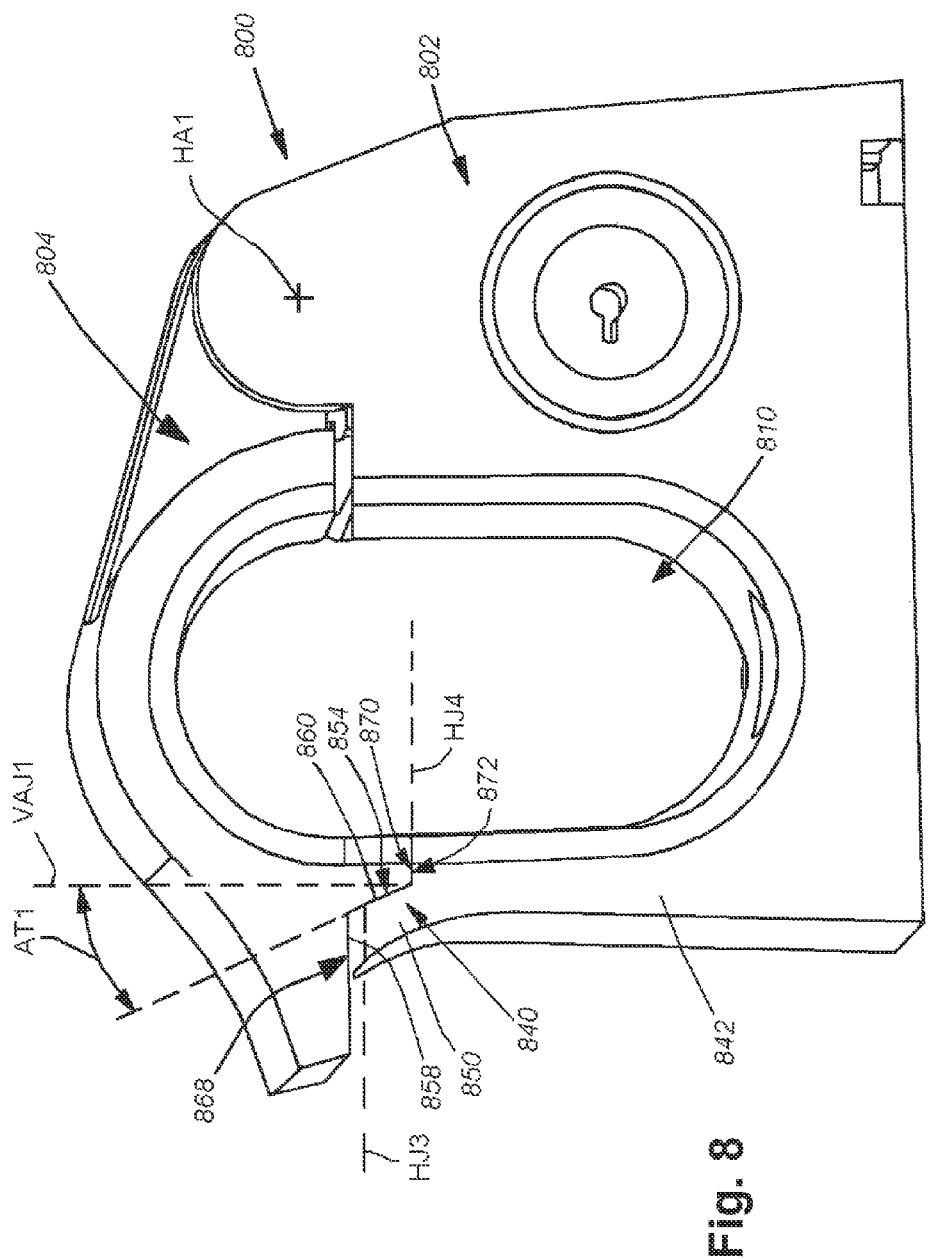
FIG. 8 is a perspective view of a firearm locking system including a lip-free construction at the front joint between the gate and the base according to an alternate embodiment.

The geometry of the front joint 440 of the above-described locking system 400 includes a downwardly projecting front lip 760 that defines a sturdy front wall of the groove 570 to cover the upper front wall of the tongue 710. In an alternate embodiment, it is contemplated that the locking system can omit the front lip and rely on the inset, overlapping joint and approximately horizontal confronting surfaces facing the front exterior of the base and gate. FIG. 8, thus, details a locking system 800 in the closed (locked) position that is otherwise similar in structure and function to the locking system 400 described above. The system includes a base 802 and gate 804 that hinges along hinge axis HA1 to allow selective access to a channel 810. The front joint 840 consists of a base overlap structure 850 and a gate overlap structure 860. The base overlap structure 850 extends upwardly from the base front wall 842 at an acute angle with AT1 with respect to the vertical plane of axis VAJ1 that can be similar to angle AT described above. The gate overlap structure extends downwardly to reside in an inset 854 defined by the interior wall of the base overlap structure 850. The base overlap structure 850 extends upwardly to a top surface 858 that resides within the horizontal plane of horizontal axis HJ3. This is confronted by a horizontal surface 868 on the gate front joint. The gate overlap structure 860 also includes a bottom surface 870 that confronts a bottom surface 872 of the inset. These surfaces 870 and 872 reside generally within a horizontal plane of axis HJ4, but can be non-horizontal in alternate embodiments. Likewise the angle of surfaces 585 and 868 can be non horizontal—for example angled slightly downwardly and rearwardly.

While the locking system of FIG. 4 lacks the downwardly projecting lip 760 of the locking system 400 described above, it still provides a geometry that limits the ability of an individual with a flat-headed tool to establish leverage due to torsion of the tool within the seam between the surfaces 858 and 868. Thus, the "internal lap joint" defined by this geometry—in which an inner overlap structure of the lid confronts an inset and the external (forward) seam of the front joint is essentially horizontal—ensures a higher level of security. As this structure defines each of the elements of the above-described tongue and groove joint except the lip (760), for the purposes of this description, the term "internal lap joint" should be taken broadly to include the portions of the groove other than the lip. Thus, an "internal lap joint" with a "front lip" can be taken as equivalent to the "groove" described herein.

III. General Considerations and Accessories

In various embodiments herein, and to understand relative scale, the side-to-side width of the locking system 400 is approximately 3.5 inches. The vertical height of the locking system 400 is approximately 3 inches. The front-to-rear width of the channel 410 is approximately 3 inches and the height of the channel is approximately 2.5 inches. The unloaded weight of the locking system is approximately 1 pound. These dimensions and the weight can vary based on the types of materials used in the construction, the robustness of the structure, and the overall size of the weapon being secured. For example, a tear gas gun or other non-lethal force weapon can have a barrel of 40 mm or larger, requiring a larger channel and associated locking system.

The exposed surfaces of the locking system in any embodiment herein can be provided with a powder-coated finish or another effective coating, for example, bear metal, painting anodizing, powder coating, plating, bluing, Parkerizing, rubberizing, or another durable finish.

As an option, as shown in FIG. 5, an adapter 580 (constructed, for example from aluminum, polymer, and the like, can be placed into the channel of any of the embodiments herein to provide a secure fit for a smaller, narrower weapon barrel—such as that of a military pattern rifle (e.g. the AR-15 or M4 carbine). The adapter 500 is provided with a curved lower surface 582 that corresponds to the curvature of the base channel bottom. In various arrangement it includes a flat upper surface 584 that can be provided with a mounting hole 586 for a through-bolt (not shown) to anchor the adapter to the base via a threaded receiving hole 650 in FIG. 6. The top surface 584 of the adapter 580 can be lined with a non-marring, cushioning/gripping material as set forth above. In alternate embodiments, the top surface of the adapter can be contoured to better fit a smaller barrel.

In operation, the locking system 400, 800 is accessed by inserting a key or other securing access device into the lock 450 and opening the gate 402. The elongate portion (e.g., barrel) of a firearm/weapon is then placed into the base channel 520, and the gate 402 is closed until the locking pin seats in the gate hinge. The weapon is then securely retained until removed. The steps for removal are to first unlock the lock mechanism 450, open the gate 402 and remove the weapon. Electrical operation is similar to this manual procedure. Instead of keying the lock, the user actuates a solenoid via a switch or other interface. As an option, the gate can be provided with a coil or torsion spring that automatically pops open the gate upon release of the locking pin. This feature can be employed in applications (for example) in which the weapon is unlikely to fall from the mount when the gate is released. However, certain users might employ such an option even in cases in which the weapon can fall.

Figure 9:
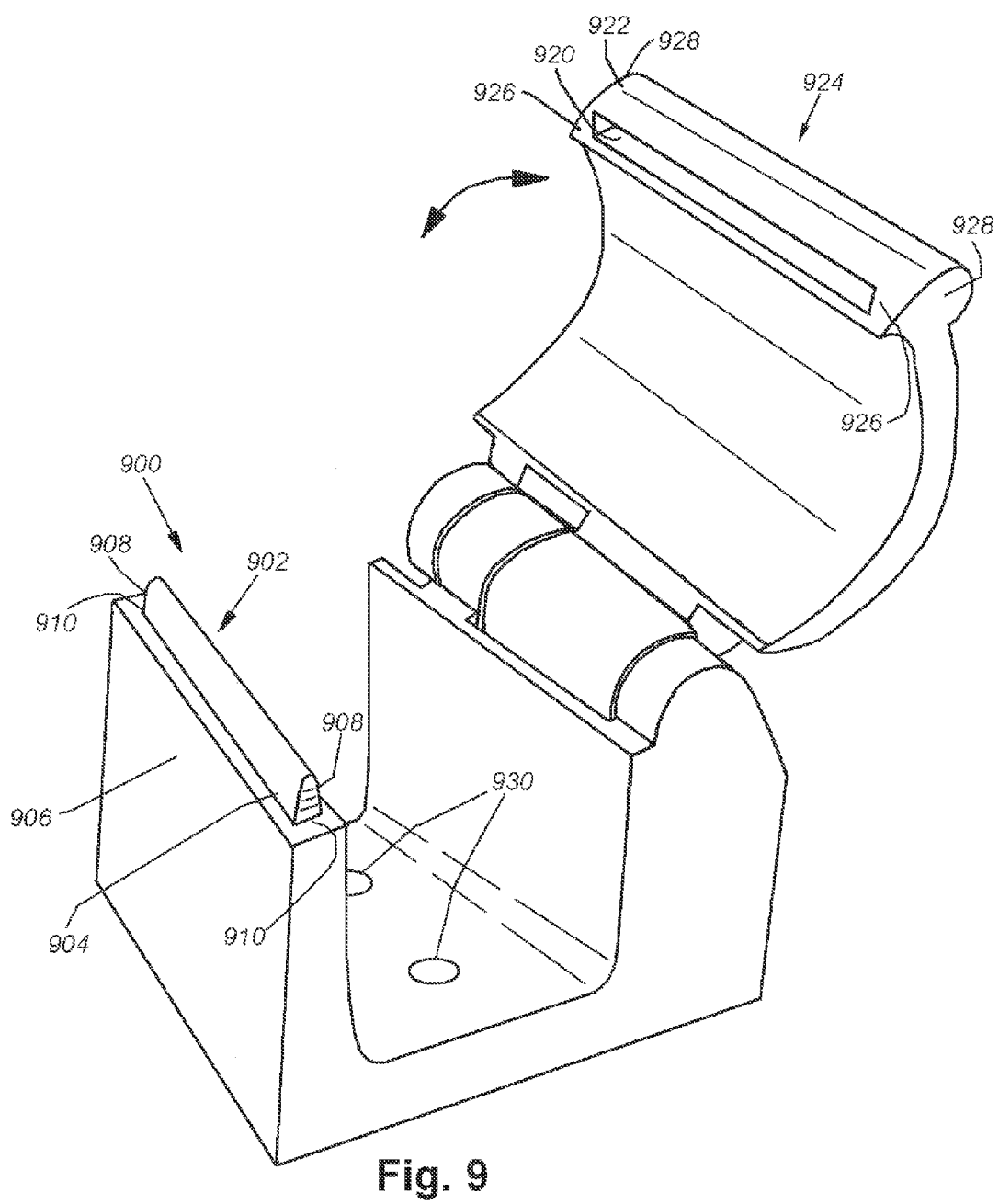
FIG. 9 is a perspective view of a firearm locking system according to another embodiment.
Figure 10:
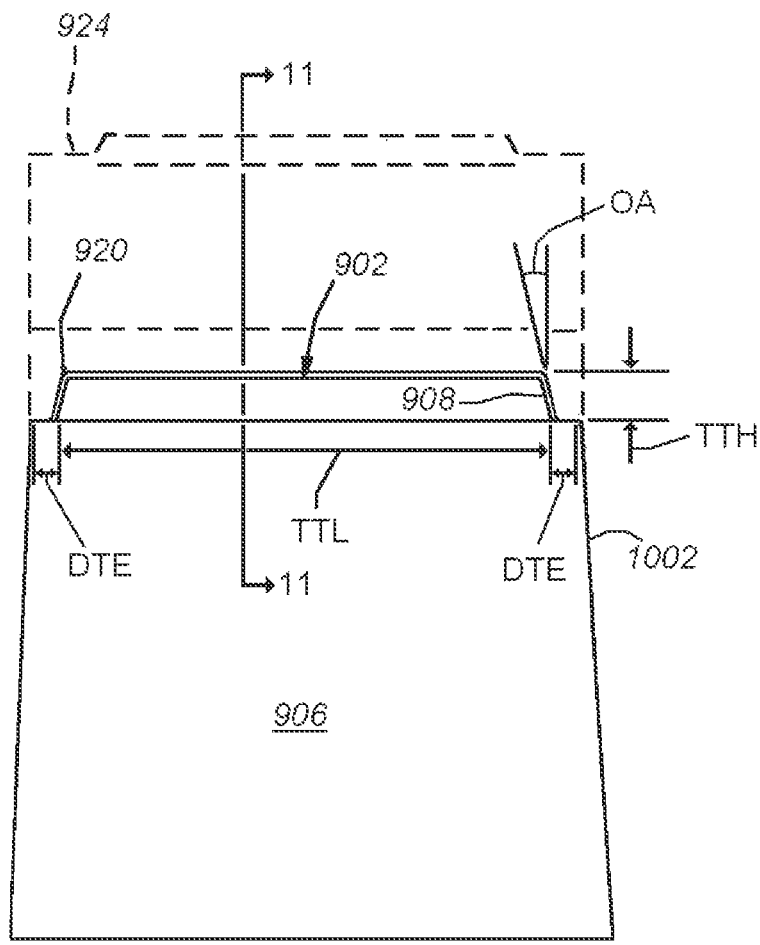
FIG. 10 is a frontal view of a firearm locking system according to another embodiment.
Figure 11:
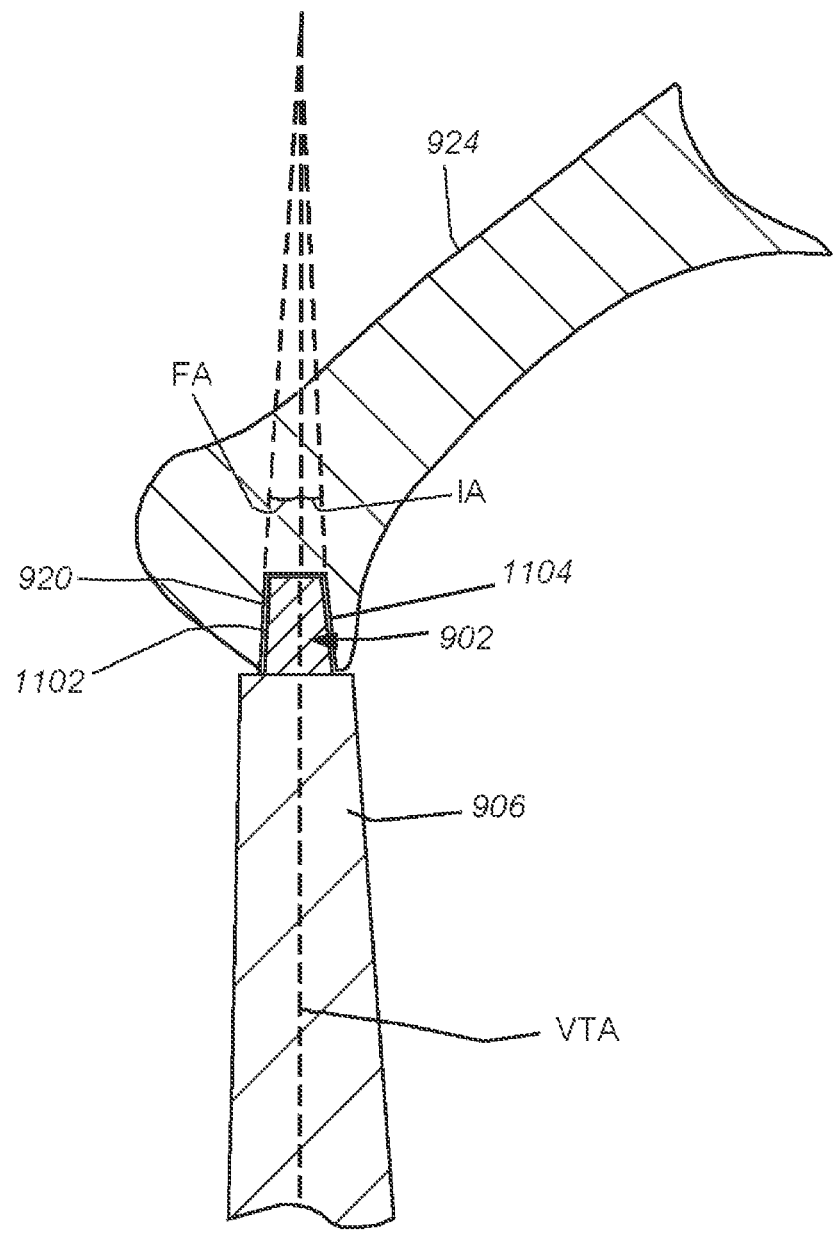
FIG. 11 is a side cross section of the overall locking system taken along line 11-11 of FIG. 10.

FIGS. 9-11 show a further embodiment of a firearm lock that has a tongue that does not extend fully to the ends of the base wall and is, rather, enclosed on all sides by the gate. FIG. 9 depicts the firearm lock 900, which is provided with a tongue 902 positioned along the top 904 of a base wall 906. The tongue 902 is constructed and arranged such that the ends 908 do not extend to the ends of the base wall 906, leaving end portions 910 of the top relatively level and without a tongue. The tongue 902 is constructed and arranged to engage a receiving groove 920 provided in the lip 922 of the gate 924. The receiving groove 920 is constructed such that the groove does not completely extend across the lip 922 as the groove as described above in FIGS. 4-7, and an ungrooved portion 926 of the lip is located between the respective ends of the groove 920 and the ends 928 of the gate that engage the base in flush, face-to-face contact. The tongue engages the receiving groove in the closed position. The recessed ends 908 of the tongue 902 prevent unauthorized access to the tongue and receiving groove interface. The firearm lock is provided with at least one through-hole 930 for mounting. In the illustrative embodiment, a pair of mounting holes 930 is provided to secure the overall lock to a vehicle or other structure.

FIG. 10 shows the tongue 902 that does not extend fully to the ends of the base wall 906. The length TTL of the tongue 902 is approximately 62 mm. The distance DTE between the tongue end 908 and the outer face 1002 of the base wall, described as the level end portion 910, is approximately 4 mm. The tongue height TTH is approximately 5 mm. The tongue ends 908 are offset at an angle OA of approximately 15 degrees, such that the ends are beveled inwards to enable closure of the gate 924. The receiving groove 920 is constructed and arranged to have an interior geometry that conforms to the tongue with a narrow clearance, so that the gate is secure against tampering, as described above. The measurements TTL, DTW and TTH can be greater or lesser in other embodiments, and the offset angle OA can be greater or lesser.

Figure 12:
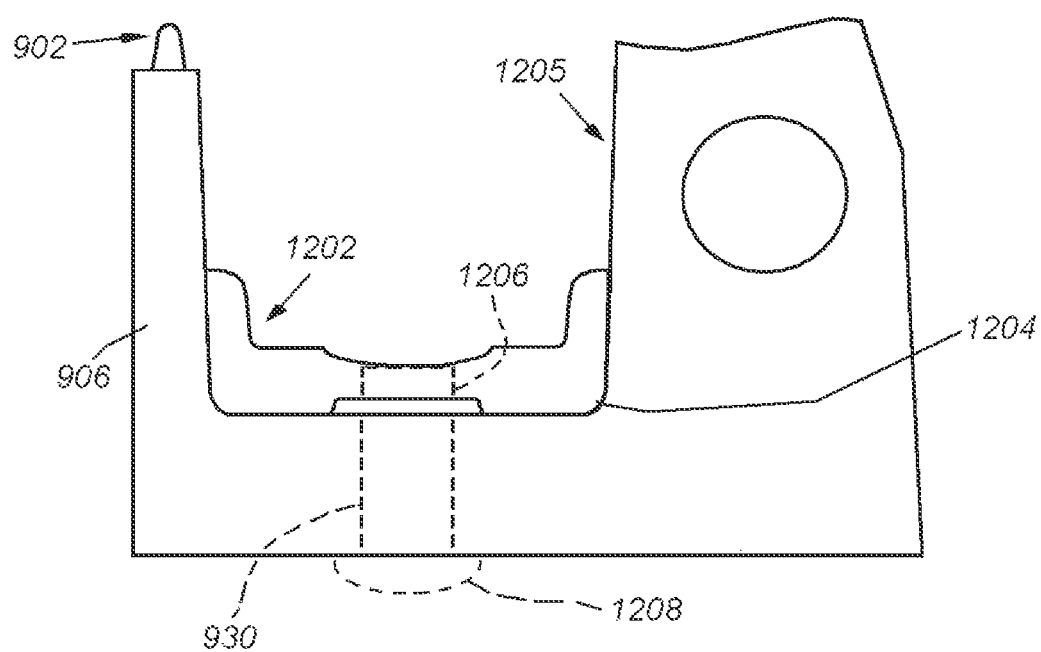
FIG. 12 is a side view of a firearm locking system also detailing an optional insert that can be employed to reduce the size of the of the system's channel for use with weapons of smaller sizes.

FIG. 11 is a cross-section view along lines 11-11 of FIG. 10 and shows the geometry of the tongue 902 and receiving groove 920. The front face 1102 of the tongue is offset at an angle FA of approximately 10 degrees relative to the central vertical tongue axis VTA. The inner face 1104 of the tongue is offset at an angle FA of approximately 10 degrees relative to the central vertical tongue axis VTA. The corresponding internal geometry of the receiving groove 920 has the same angular geometry as the tongue so as to provide a uniform confrontation with the tongue. It is expressly contemplated that the angular geometry of the tongue faces and interior walls of the receiving groove can be greater or lesser in other embodiments. Likewise, the clearance between the tongue and the groove can vary A firearm lock having an adapter insert 1202 is shown in FIG. 12. The exemplary insert 1202 is removably secured to the floor 1204 of the exemplary firearm lock 1205 by a retaining bolt 1208 that secures the insert 1202 to the firearm lock. The insert 1202 provides for secure accommodation of weapons that have applicable member parts that are smaller than the interior geometry of the firearms lock, for example, the barrel of a shotgun or of a weapon having an elongated barrel and/or barrel suppressor system. In other embodiments, the insert can be thicker than depicted. The insert can be constructed of a rigid or a non-rigid polymer or a metal. The insert can have an additional lining of a resilient material to reduce wear to the finish of the enclosed item.

It should be clear that the firearm locking system for vehicles provides a substantially more secure and tamper-free device than that available in traditional prior art arrangements. The unique geometry of the front joint ensures denial to an individual of a good lever point in which to either twist or pry a flat-headed tool, such as a screwdriver. This design, this significantly enhances the public safety and trust in authorities by ensuring that dangerous weapons are less likely to become the prize of a fast-acting criminal.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the channel lining can be smooth or ribbed. The elongated portion of the weapon secured by the lock can be a barrel, stock, foregrip, or the like and the lock's dimensions can be adapted to secure such structure. The lock can be fitted with a remote control locking mechanism. The lock can have an additional lining of a resilient material to reduce wear to the finish of the enclosed item. The exterior surface of the gate and base can include a variety of stiffening ribs or projecting features that can provide various decorative and/or structural enhancements to the gun lock system. It is also expressly contemplated that the cross-sectional geometry of the gun lock system can vary across the longitudinal axis but generally in keeping with the secure arrangement described above, in which the ability of an individual to forcibly pry open the structure is limited. Additionally, the gate can be divided into a plurality of side-by-side segments across the longitudinal axis, co-linear or parallel to the axis of the hinges, each segment being served by a portion of the locking tumbler assembly. In this manner, the effective forcible prying of any single segment would not completely defeat the locking action of the system. Two locking systems can be combined in a single installation to secure larger weapons or other tools by separating such locking systems by an appropriate distance. An alarm system can be included in the lock for alerts if tampered with. As used herein, the term "police" can be construed to extend to any law enforcement, military, private security, and/or paramilitary organization, including but not limited to the military police, military units, Federal agencies (for example, Homeland Security, Federal Bureau of Investigation, U.S. Marshal Service), and the like. Accordingly, this description is meant to be taken only by way of example, and not to otherwise limit the scope of this invention.

What is claimed is:

1. A locking system for a weapon comprising:
    a base defining a base channel for receiving an elongated portion of a weapon;
    a gate, hingedly attached to the base by a hinge assembly, the gate moving between an open position and a closed position, the gate defining a gate channel that is adjacent to the base channel in the closed position;
    a lock assembly that selectively secures the gate with respect to the base in the closed position; and
    a front joint, opposite the hinge assembly, including an internal lap joint with an overlap structure on each of a base front joint edge and a gate front joint edge, the overlap structure defining a parallelpiped-shaped tongue on the base front joint edge.

2. The locking system as set forth in claim 1 wherein the base front joint edge and the gate front joint edge each define a confronting approximately horizontal surface forward of the internal lap joint.

3. The locking system as set forth in claim 2 wherein the gate front joint edge further comprises a downwardly projecting lip that overlaps a front surface of the base front edge.

4. The locking system as set forth in claim 3 wherein a confronting wall in each of the base front edge and the gate front edge at the internal lap joint is upwardly and forwardly angled at approximately 6 to 10 degrees with respect to a vertical plane transverse to a plane of the horizontal surface and the front surface of the base front edge and a confronting wall of the lip are each upwardly and a forwardly angled at approximately 6 to 10 degrees with respect to the vertical plane.

5. The locking system as set forth in claim 2 wherein a confronting wall in each of the base front edge and the gate front edge at the internal lap joint is upwardly and forwardly angled at approximately 6 to 10 degrees with respect to a vertical plane transverse to a plane of the horizontal surface.

6. The locking system as set forth in claim 1 wherein at least one of the base and the gate is constructed as a casting.

7. The locking system as set forth in claim 1 wherein at least one of the base and the gate is constructed from at least one of a metal, a polymer and a composite material.

8. The locking system as set forth in claim 1 wherein at least one of the base channel and a gate channel defines a rounded portion to conform to an elongated portion of the weapon.

9. The locking system as set forth in claim 8 wherein the base channel is lined with a protective layer of material.

10. The locking system as set forth in claim 1 wherein the lock assembly is at least one of (a) manually actuated and (b) electrically actuated.

11. The locking system as set forth in claim 1 in which the base includes with pre-drilled mounting holes.

12. The locking system as set forth in claim 1 further comprising an insert that reduces a depth of the base channel.

13. The locking system as set forth in claim 1 wherein an elongated portion of a weapon that is enclosed by the locking system includes at least one of a stock, integral suppressor, detachable suppressor, foregrip and barrel.

14. A locking system for a weapon comprising:
    a base defining a base channel for receiving an elongated portion of a weapon;
    a gate, hingedly attached to the base by a hinge assembly, the gate moving between an open position and a closed position, the gate defining a gate channel that cooperates with the base channel in the closed position to form an enclosure for receiving the elongated portion of the weapon;

a lock assembly that selectively secures the gate with respect to the base in the closed position; and a front joint, opposite the hinge assembly, including a gate front joint edge defining a groove extending an entire length of the gate front joint edge and a base front joint edge defining a tongue extending an entire length of the base front joint edge, the groove conforming to and confronting the tongue in the closed position.

15. The locking system as set forth in claim 14 wherein the tongue and the groove include an internal lap joint formed between an interior wall of the tongue and a confronting wall of the groove.

16. The locking system as set forth in claim 15 wherein the tongue includes a top surface and the groove includes a confronting groove top surface each approximately aligned along a horizontal plane in the closed position.

17. The locking system as set forth in claim 16 wherein the interior wall of the tongue and an exterior wall of the tongue are each tapered upwardly and forwardly at approximately 6 to 10 degrees with respect to a vertical plane transverse to the horizontal plane.

18. A locking system for a weapon comprising:

a base defining a base channel for receiving an elongated portion of a weapon;

a single tongue on the base that is arranged along a portion of a front wall of the base, the front wall having a length $l_{FW}$ measured between opposing ends of the front wall, the single tongue having a length $l_T$ such that ½ $l_{FW} < l_T < l_{FW}$;

a gate, hingedly attached to the base by a hinge assembly, the gate moving between an open position and a closed position, the gate defining a gate channel that is adjacent to the base channel in the closed position, the gate defining a single internal receiving groove that engages the single tongue in the closed position; and a lock assembly that selectively secures the gate with respect to the base in the closed position.

19. The locking system as set forth in claim 1 wherein an insert is removably attached to the base that is constructed and arranged to closely engage the enclosed member of the firearm.

20. The locking system as set forth in claim 1 wherein the system includes at least one of a key-operated and electrically opened lock that maintains the gate in the closed position.

\* \* \* \* \*